United States Patent [19]
Richter

[11] Patent Number: 5,136,843
[45] Date of Patent: Aug. 11, 1992

[54] APPARATUS FOR BURNING THE CONTAMINATED SOOT PARTICLES IN EXHAUST GASES OF DIESEL MOTORS

[76] Inventor: Gerhard Richter, Matzenbergstr. 141-143, 4200 Oberhausen, Fed. Rep. of Germany

[21] Appl. No.: 403,593

[22] Filed: Sep. 5, 1989

[51] Int. Cl.⁵ ............................................. F01N 3/26
[52] U.S. Cl. ....................................... 60/280; 60/303; 60/902
[58] Field of Search ........................... 60/280, 303, 902

[56] References Cited

U.S. PATENT DOCUMENTS

| | | | |
|---|---|---|---|
| 3,017,948 | 1/1962 | Shepherd | 60/280 |
| 3,050,375 | 8/1962 | Bloch | 60/280 |
| 3,404,965 | 10/1968 | Shiller | 60/303 |
| 4,573,317 | 3/1986 | Ludecke | 60/303 |
| 4,731,994 | 3/1988 | Dettling | 60/303 |
| 4,744,213 | 5/1988 | El-Nashar | 60/280 |

Primary Examiner—Douglas Hart
Attorney, Agent, or Firm—Akoo-Toren

[57] ABSTRACT

The apparatus for burning the contaminated soot particles in the exhaust gases of diesel motors of vehicles comprising in the exhaust gas line a housing with a burner operated with a fuel/air mixture for burning the contaminated particles in the exhaust gas flow. The housing comprises a rotatably supported hollow cylinder through which the exhaust gases flow. The housing and the hollow cylinder bound the combustion space of the burner, wherein the hollow cylinder comprises drive vanes and the exhaust gases of the diesel motor and/or the exhaust gases of the burner act upon the drive vanes and wherein the exhaust gases of the burner heat the hollow cylinder up to the combustion temperature of the soot particles. The arrangement can be also made in such a way, that the exhaust gases and/or the combustion gases of the burner flow through bores into the perforated hollow cylinder and exit through the one open end face of the perforated hollow cylinder.

25 Claims, 4 Drawing Sheets

APPARATUS FOR BURNING THE CONTAMINATED SOOT PARTICLES IN EXHAUST GASES OF DIESEL MOTORS

The invention is directed to an apparatus for burning of contaminated soot particles in exhaust gases of diesel motors of vehicles, wherein the exhaust gas line comprises a housing with a burner operated by a fuel/air mixture for burning the contaminated soot particles in the exhaust gas flow.

By diesel motors of vehicles the invention means diesel motors of tank tractor trailer units, trucks, buses, motor vehicles and of ships.

Devices for burning the contaminated soot particles contained in exhaust gases of diesel motors of vehicles, wherein the exhaust gas line comprises a housing with a burner operated with a fuel/air mixture burning the contaminated soot particles in the exhaust gas flow are known (DE-PS 34 11 358).

They have been provided in tank tractor trailer units, comprising a heat exchanger behind the exhaust manifold, which extracts the heat contained in the hot exhaust gas flow of the diesel motor by means of heat transfer oil circulating in a closed cycle, which extracted heat is supplied in a regulated manner to the tank contents and maintains these at a predetermined temperature.

In order to extract as much energy as possible from the exhaust gas flow it is contemplated to burn the soot particles contaminated with carcinogenic substances contained in the exhaust gas flow of the diesel motor and to transfer the thus additionally produced heat onto the tank contents also by means of the heat exchanger.

Therefore a device for burning these contaminated soot particles was arranged upstream of the heat exchanger, which basically comprised a nozzle oriented in the direction of flow of the combustion gases for the regulated supply of fuel and air by way of a burner, whose flame heated the soot particles in the exhaust gas flow up to the combustion temperature.

It was however seen that the fuel consumption was too high when the diesel motor was running and that the rpm range of the motor affected the differing exhaust gas quantity of the burner because of back pressure.

This entailed that the burner flamed out in routine operation and additional fuel consumption was necessary. A complete combustion of the soot particles could not be achieved, since the required degree of turbulence of the smoke gases did not occur in the gap between the ceramic insert used and the outer wall.

Furthermore, it was seen that it is impossible to fill the entire inside cross-section with flame, so that all soot particles pass through a flame wall.

Furthermore, it is known to conduct the exhaust gas flow alternately through two filters, which retain the contaminated soot particles. As soon as one filter is blocked, the soot particles are burned by heating the filter material, while the exhaust gas flow is directed through the other filter.

This solution also requires considerable energy- and fuel consumption, is difficult designwise and so far has not been accepted in actual practice.

The invention is based upon the task of creating an apparatus for burning the contaminated soot particles contained in the exhaust gases of diesel motors of vehicles, wherein the exhaust gas line comprises a housing with a burner operated by a fuel/air mixture for burning the contaminated soot particles contained in the exhaust gas flow and which avoids the up to now required enormous energy consumption, the use of filters, as well as possibly of catalysts.

In a first solution principle this task is solved in that the housing comprises a rotatably supported hollow cylinder through which the exhaust gas flow passes, that the housing and the hollow cylinder bound the combustion space of the burner, that the hollow cylinder comprises drive vanes or drive buckets, that the exhaust gases of the diesel motor and/or the exhaust gases of the burner act upon these drive vanes and that the exhaust gases of the burner heat the hollow cylinder up to the combustion temperature of the soot particles.

Because the burner flame now no longer also simultaneously contributes to heating the exhaust gas flow, the fuel consumption of the burner is economically justifiable. Due to the rotation of the hollow cylinder it is heated onto the combustion temperature of the soot particles over its entire surface.

It was surprisingly seen that these measures assure a reliable combustion of surprisingly the soot particles in all load ranges of the diesel motor.

These effects have not yet been clarified in their details. The soot particles, which are entrained by the exhaust gas flow exiting in turbulent bursts from the diesel motor, are probably subjected to centrifugal forces in the rotating hollow cylinder, so that under full load and with maximum flow velocity of the exhaust gas stream the soot particles are reliably brought into contact with the hot wall of the hollow cylinder and are burned.

Since the likelihood that the soot particles come into contact with the wall of the hollow cylinder only in a turbulent exhaust gas flow is proportional to the length of the hollow cylinder and inversely proportional to the flow velocity of the exhaust gas stream, meaning to their dwelling time in the hollow cylinder, the surprisingly occurring effect can only be construed in such a way that a rotating flow is superimposed upon the turbulent flow in the rotating hollow cylinder, so that centrifugal forces are exerted due to friction upon the soot particles, which forces increase with increasing flow velocity of the exhaust gas stream and which attain their maximum value under full load operation, so that the combustion of the soot particles is assured throughout the entire operational range of a diesel motor.

In view of the complex flow conditions of the exhaust gas flow exiting in bursts, meaning in a pulsating manner from a diesel motor, theoretical computation in advance is generally impossible.

Thus the surprising effects were achieved with the usual inside diameter of approximately 11 cm of the exhaust gas line of a tractor and with the length of the hollow cylinder of approximately 20 cm.

It is especially surprising that seizing of the bearings of the hollow cylinder did not occur even with extremely high temperatures at high rpms of the hollow cylinder, even when operated for long durations. Presumably this surprising effect can be explained by the circumstance that soot particles fulfill the function of a lubricant.

According to a preferred embodiment example of this first solution principle the hollow cylinder comprises a shaft and is connected with said shaft by radially extending webs, wherein the end segments of the shaft are respectively supported in a bearing bush, the housing having two bearing flanges and the bearing flanges being connected with the bearing bushes by means of radially extending webs.

In order to drive the hollow cylinder, the webs connecting the hollow cylinder with the shaft can according to the invention be designed as drive vanes, the drive vanes can also be arranged on the shaft or on the inside wall of the hollow cylinder, wherein the exhaust gas flow acts upon the drive vanes. They can also be arranged on the outer wall of the hollow cylinder and are then acted upon by the exhaust gases of the burner.

In an additional embodiment of the invention a hollow shaft with drive vanes is rotatably supported upon the shaft of the hollow cylinder, so that an additional spin in direction of the inner wall of the hollow cylinder is imparted to the soot particles.

In order to direct the soot particles even more strongly onto the inner wall of the hollow cylinder, the end segment of the shaft facing the exhaust gas flow comprises, in an additional embodiment of the invention, a stagnation- and reversal member for the exhaust gas flow entering into the rotating hollow cylinder. In the simplest case this is a cone in the invention whose apex points counter to the direction of the exhaust gas flow.

In yet another embodiment of the invention the hollow cylinder and the bearing flange for the hollow cylinder bound a outlet gap for the exhaust gases of the burner in the outlet region of the exhaust gas stream from the hollow cylinder.

This measure achieves that an underpressure is always present in the gap because of the flow velocity of the exhaust gas flow, which on the one hand assures that the exhaust gases of the burner are conducted away in a simple and secure manner and which on the other hand can be utilized for the control of the burner, since the underpressure increases with increasing flow velocity of the exhaust gas stream and with rising rpms of the hollow cylinder. Since the heat rejection at the inner wall of the hollow cylinder then also increases, the increasing heat extraction by the exhaust gas flow must be compensated by an increased supply of heat energy to the inner wall of the hollow cylinder. In all of these measures in the invention the hollow cylinder can have solid or perforated walls.

In yet another embodiment of the invention the hollow cylinder is perforated, wherein the quantity of the bores are selected in such a way and the axis of the bores is inclined in such a way to the axis of the hollow cylinder, that the exhaust gases of the burner flowing through the bores impart an additional spin to the hollow cylinder.

It is achieved by these measures that the flame of the burner strikes the inner wall through the bores in the wall of the cylinder and forms upon said inner wall a flame wall throughout wide regions, which flame wall burns the soot particles.

It was seen that the quantity of the bores and their distribution must be determined experimentally, so that this effect is assured in the entire power range of the diesel engine.

A special advantage consists in that the soot particles contained in the exhaust gases of the burner are also burned, the burner is preferably operated with diesel fuel from the reservoir of the diesel engine.

The task of creating an apparatus for burning the contaminated soot particles in the exhaust gases of diesel engines of vehicles, wherein the exhaust gas line comprises a housing with a burner operated by a fuel-/air mixture for burning the contaminated soot particles in the exhaust gas stream, is solved by a second basic solution; in this solution the housing has a rotatably supported hollow cylinder which is located in the flow of the exhaust gas stream, that the housing and the hollow cylinder limit a reversal chamber for the exhaust gas flow, that the hollow cylinder comprises drive vanes, that the exhaust flow of the diesel engine and/or the exhaust gases of the burner act upon the drive vanes, that the burner is arranged upstream of the one open end face of the hollow cylinder and that the exhaust gas of the burner heats the hollow cylinder up to the combustion temperature of the soot particles.

These measures also achieve a surprisingly reliable combustion of the soot particles, wherein also comparatively small fuel quantities must be supplied to the burner, since also only the wall of the hollow cylinder must be heated in order to burn the soot particles.

According to a preferred embodiment example of the second basic solution the hollow cylinder comprises a shaft and is connected to the shaft by radially extending webs, wherein the end segments of the shaft are respectively supported in a bearing bush, wherein the housing comprises two bearing flanges and the bearing flanges are connected with the bearing bushes by radially extending webs. The webs connecting the hollow cylinder with the shaft can be designed as drive vanes in the invention for the purpose of driving the hollow cylinder, the drive vanes can also be arranged on the shaft or on the inside wall of the hollow cylinder, wherein the exhaust gases of the burner act upon the drive vanes. They can also be arranged on the outer wall of the hollow cylinder and are then acted upon by the flow of the exhaust gases.

In yet another embodiment in the invention a hollow shaft with drive vanes is rotatably supported upon the shaft of the hollow cylinder so that an additional spin in direction of the inner wall of the hollow cylinder is imparted to the hot burner gases.

In order to direct the flame of the burner upon the inner wall of the hollow cylinder, the end segment of the shaft facing the burner comprises a stagnation- and reversal member for the flame or the exhaust gases of the burner according to yet another embodiment of the invention. The stagnation- and reversal member in the invention is a cone in the simplest case which points with its apex counter to the direction of the burner gases.

In another embodiment of the invention the hollow cylinder and the bearing flange for the hollow cylinder bound an outlet gap for the exhaust gas flow in the outlet region of the exhaust gas flow from the hollow cylinder.

If all these features of the invention according to the second basic solution the hollow cylinder must have solid walls.

In yet another embodiment of the invention the hollow cylinder is perforated, wherein the quantity of the bores is chosen in such a way and the axis of the bores is inclined to the axis of the hollow cylinder so that the exhaust gas stream flowing through the bores of the hollow cylinder imparts an additional spin to the hollow cylinder and that the flow velocity of the exhaust gas flow is reduced in the apparatus in the invention, since the exhaust gas flow can exit from the apparatus along the inner wall and along the outer wall of the hollow cylinder.

The task is solved in accordance with a third basic solution by having the housing comprise a rotatably supported and perforated hollow cylinder located in the flow of the exhaust gases and of the exhaust gases of the burner, with the housing and the hollow cylinder comprising respectively two chambers, one for the exhaust gas flow and one for the exhaust gas of the burner, with the perforated hollow cylinder comprising drive vanes, with the exhaust gas flow and/or the exhaust gases of the burner acting upon the drive vanes, with the exhaust gas flow and the exhaust gases of the burner flowing away through the open end face of the perforated hollow cylinder and with the exhaust gases of the burner heating the hollow cylinder up to the combustion temperature of the soot particles.

According to a preferred embodiment example in the invention the intermediate space between the housing and the perforated hollow cylinder is subdivided into the two spaces by a plain bearing. In yet another embodiment of the invention according to the first, second and third basic solution the housing with the hollow cylinder is arranged directly downstream of the exhaust manifold.

The invention is explained in the drawing with the help of embodiment examples.

It is shown on:

FIG. 1: an axial section through a first embodiment example of the first basic solution, FIG. 2: a section along II—II in FIG. 1, FIG. 3: a section according to III—III in FIG. 1, FIG. 4: an axial section through a second embodiment example of the first basic solution, FIG. 5a, b the detail X from FIG. 4 depicted in magnification, FIG. 6: an axial section through an embodiment example of the second basic solution.

FIG. 1 shows an axial section through the first embodiment example of the first basic solution.

1* designates the exhaust gas line in which the apparatus in the invention is arranged.

This apparatus comprises a hollow cylindrical housing 1 whose axis is aligned with the exhaust line and whose end faces comprise the bearing or support flanges 2 and 3 for the shaft 9 of the solid-walled hollow cylinder.

The segments 4 and 5 of the exhaust line, between which the apparatus is arranged, comprise a flange 6 or 7 respectively which are connected with a bearing flange 2 or 3.

The hollow cylinder has solid walls and is designated with the numeral 8, its shaft carries the numeral 9.

According to FIGS. 1 and 2 the hollow cylinder is connected with the shaft 9 by means of the drive vanes 10 and 11 in the region of its open end faces, which shaft is supported at its end segments 12 o 13 in bearing bushes 14 or 15 so as to be freely rotatable.

The bearing bushes comprise one bush 14* or 15* respectively and are made out of brass, which bushes receive the end segments 12 o 13 of the shaft with a small radial and small axial bearing clearance.

The other parts of the support arrangement and also the shaft are made of steel. As has already been mentioned the soot particles possibly fulfill the function of a lubricant at the high temperatures, since the bearing system does not seize. This fact could at least partially be due to the bushes made from brass. This effect cannot be construed conventionally.

The bearing bushes are connected according to FIG. 3 with the respectively assigned bearing flange 2 or 3 by webs 16 or 17 extending in radial direction.

The shaft can additionally comprise guide vanes 18.

The hollow shaft 20 can be supported on the shaft 9 so as to be freely rotatable and comprising a drive vane 21 extending in a helical manner.

The hollow cylindrical housing 1 transits in radial direction into the burner housing 22 where the burner 23 is arranged.

Its axis extends at the spacing to the axis of the shaft, so that a torque is exerted upon the drive vanes arranged on the outer wall of the hollow cylinder.

The bearing flange 3 and the hollow cylinder bound an outlet gap 19 for the exhaust gas flow.

A hollow cylindrically-shaped space 25 for the drive vanes 18, possibly provided on the outer wall of the hollow cylinder, is designed according to FIG. 2 between the hollow cylinder and the hollow cylindrical housing 1.

In general a combination of all the drive vanes can be provided.

The shaft 9 comprises the guide cone 24 in the region of its end segment 12.

FIG. 4 shows in the illustration of FIG. 1 a second embodiment example of the first basic solution, which differs from the first embodiment example to the extent that the hollow cylinder designated with 26 is perforated.

Identical parts are designated with identical reference numbers.

The bores of the perforated hollow cylinder 27 are designated with 28.

Segments of the exhaust gas pipe are also designated with 4 and 5, which segments extend at right angles to each other and between which housing 29 of the apparatus is arranged. The hollow cylinder 26 is perforated just as is the case in FIG. 4. The housing 29 and the hollow cylinder 26 define a reversal chamber for the exhaust gas flow.

Figure 4:
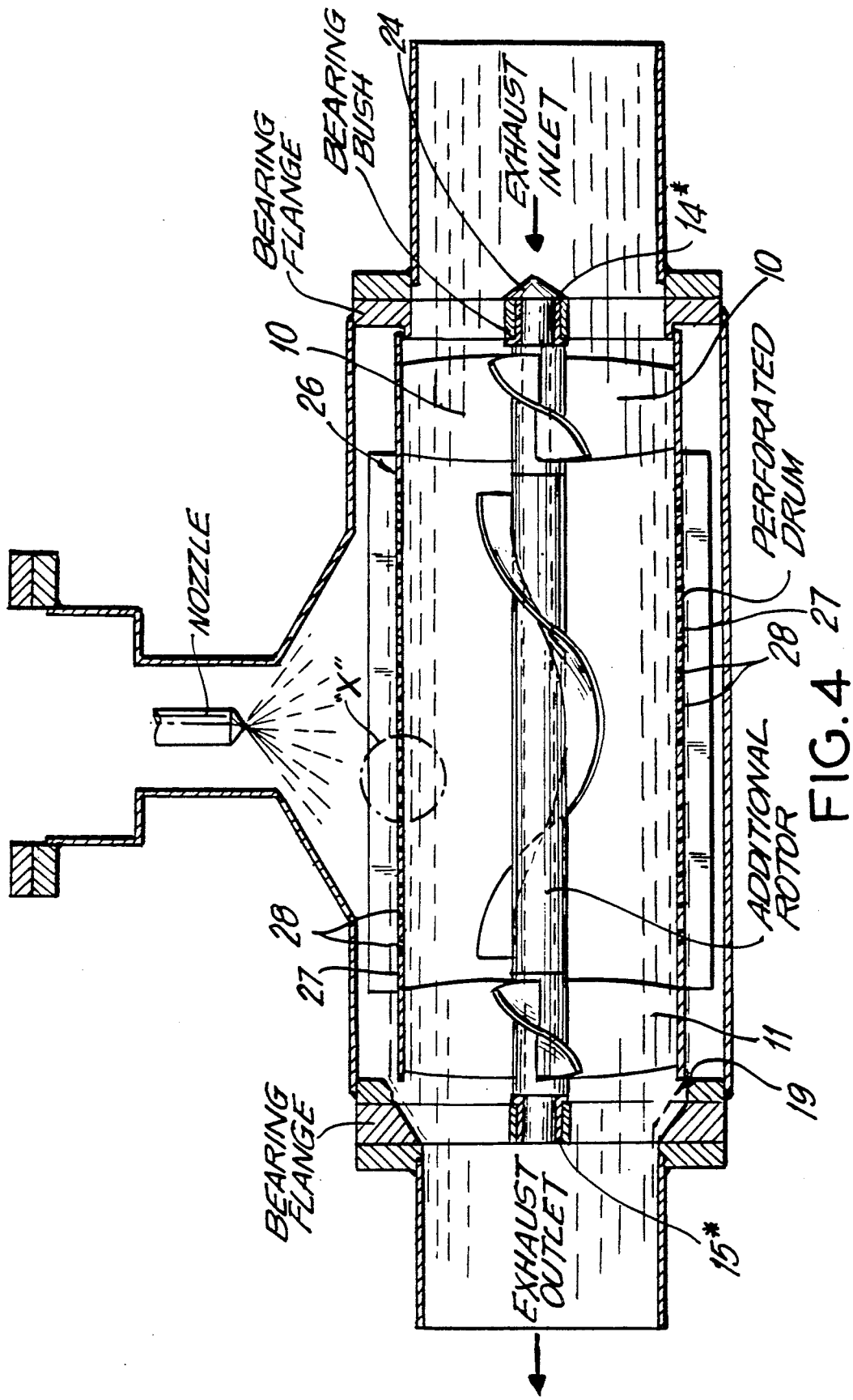

Parts coinciding with FIG. 4 carry the same designation number.

Figure 1:
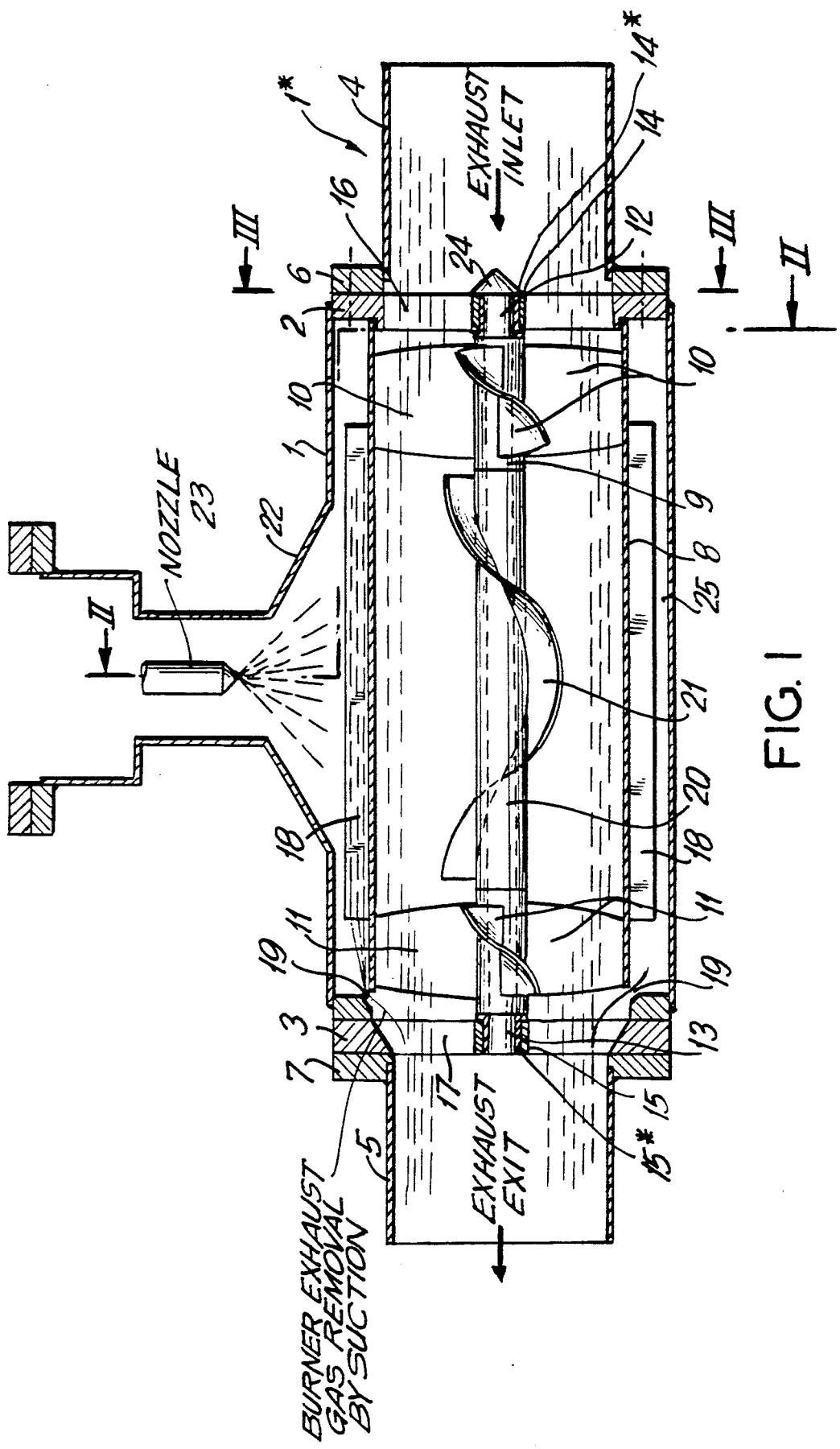
Figure 2:
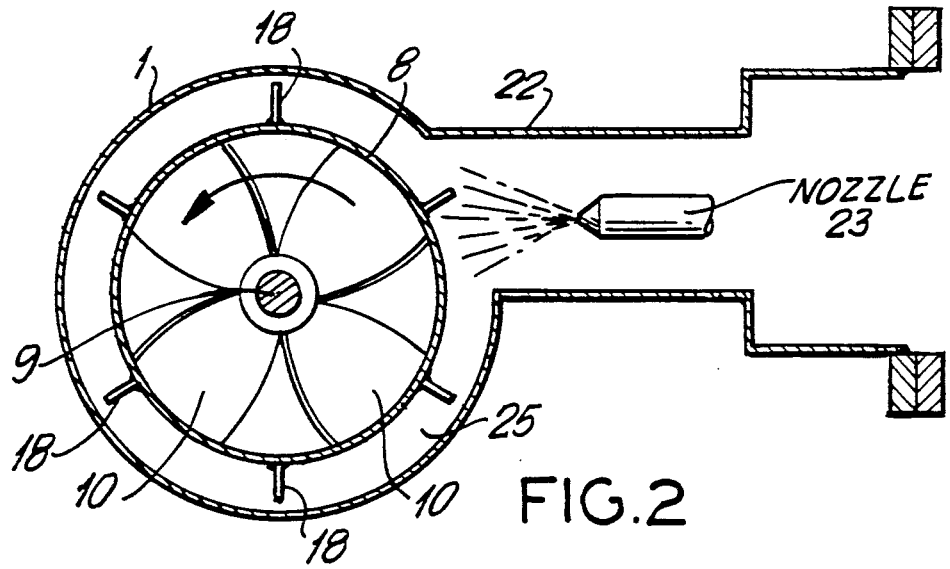
Figure 3:
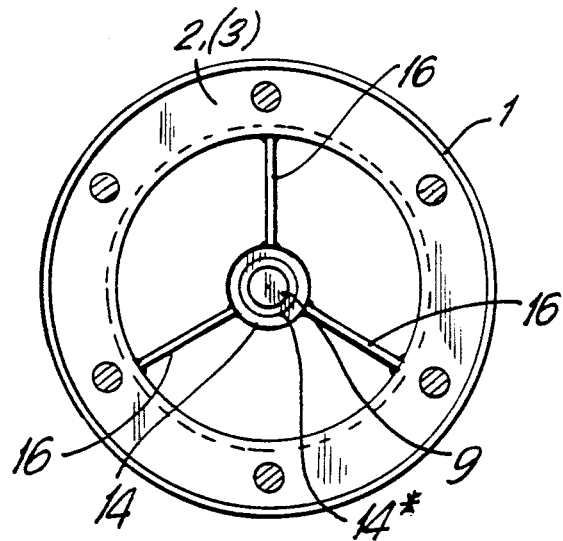
Figure 5A:
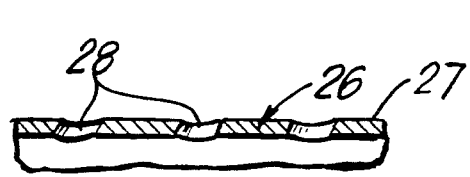
FIGS. 5a and 5b show the detail X from FIG. 4 in magnified form, from which the position of the axis of the bores which deviate from the radial direction of the axis of the shaft can be easily seen.
Figure 5B:
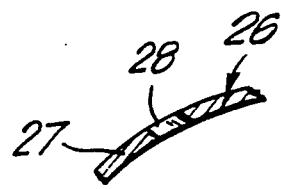

The segment 4 of the exhaust gas line discharges through a conically widening housing segment 30 sidewise into the housing 29. The segment 5 of the exhaust gas pipe is flange-connected in the same way as in FIG. 4. A burner 31 is arranged in the housing segment 32 whose flame heats the inner wall of the hollow cylinder, which again as is the case in FIGS. 1 and 4 comprises drive vanes on the inner wall and/or the outer wall and/or on the shaft. The hollow cylinder can—as depicted—be perforated, it can also have solid walls. In the last case the outlet gap 19 is also absolutely required.

Figure 6:
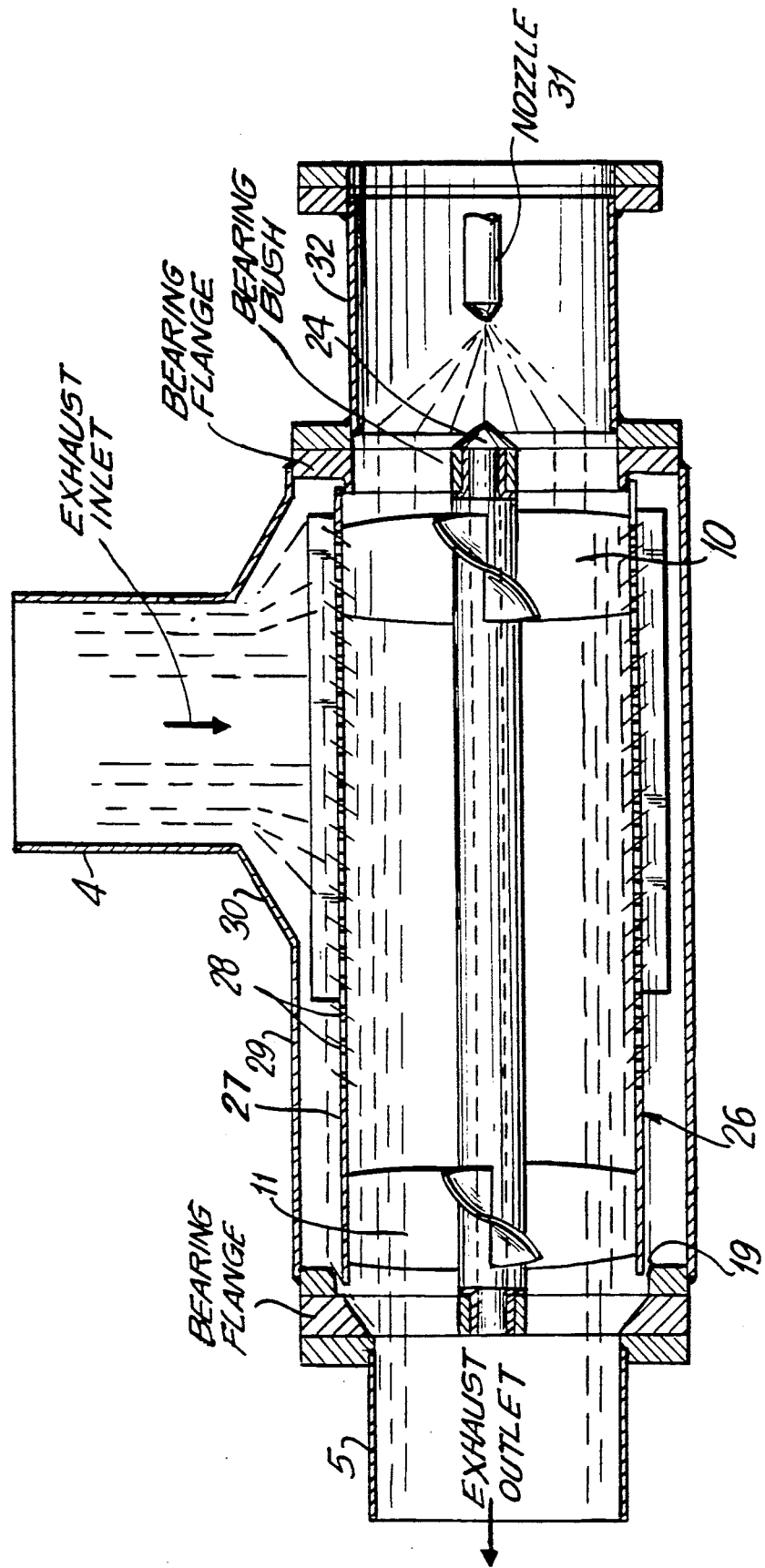
FIG. 6 shows an axial section through an embodiment example of the second basic solution.

It is a modification of the embodiment example in FIG. 6 and emanates quite easily from same that, by closing the housing designated with 31 by a flange 30 in the region adjacent to the segment 4 and aligned with the segment 5 of the exhaust gas pipe, which flange comprises at the same time a bearing for the shaft of the perforated hollow cylinder 26.

Parts which are identical with those in segment 6 are designated with the same reference number.

The intermediate space 32* between the perforated hollow cylinder 26 and the housing is subdivided by a plain bearing 3 into the two chambers 34 and 35. The segment 4 discharges into the chamber, while the burner 31 protrudes into the other chamber.

It lies within the framework of the invention to drive the hollow cylinder with an outside drive as for instance an air motor.

I claim:

1. Apparatus for burning contaminated soot particles in the exhaust gases of diesel motors of vehicles conducted through an exhaust gas line, wherein the exhaust gas line comprises a housing with a burner operated with a fuel/air mixture for burning the contaminated soot particles in the exhaust gas flow, the housing (1) comprising a hollow cylinder (8) for conducting the exhaust gases, the hollow cylinder (8) being supported rotatably within the housing (18), such that this housing and the hollow cylinder define a combustion space of the burner (23), the hollow cylinder comprising drive vanes (10, 11), means for directing at least one of the exhaust gases of the diesel motor and the exhaust gases of the burner toward the drive vanes, such that the exhaust gases of the burner heat the hollow cylinder up to the combustion temperature of the soot particles.

2. Apparatus according to claim 1, wherein the hollow cylinder comprises a shaft (9) having end segments (12, 12) and is connected with the shaft by radially extending webs, the end segments (12, 13) of the shaft each being contained in a bearing bush (14, 15), the housing comprising two bearing flanges (2, 3) and that the bearing flanges are connected with the bearing bushes by means of additional radially extending webs (16, 17).

3. Apparatus according to claim 2, wherein the webs connecting the hollow cylinder with the shaft are the drive vanes (10, 11).

4. Apparatus according to claim 2, wherein the drive vanes are arranged on the shaft.

5. Apparatus according to claim 2, wherein the drive vanes are arranged on an inside wall of the hollow cylinder.

6. Apparatus according to claim 2, wherein the drive vanes (18) are mounted on an outer wall of the hollow cylinder.

7. Apparatus according to claim 1, wherein a hollow shaft (20) with drive vanes (21) is rotatably supported upon the shaft of the hollow cylinder.

8. Apparatus according to claim 1, wherein the end segment (12) of the shaft facing the exhaust gas flow comprises a stagnation- and reversal member (24) for the exhaust gas flow.

9. Apparatus according to claim 8, wherein the stagnation- and reversal member is a cone (24).

10. Apparatus according to claim 1, wherein the hollow cylinder and the bearing flange define an outlet gap (19) for the exhaust gases of the burner in an outlet region of the exhaust gas flow from the hollow cylinder.

11. Apparatus according to claim 1, wherein the hollow cylinder (26) is perforated with bores, the number of the bores (27) being selected and each axis of the bores being inclined to the axis of the hollow cylinder, such that the exhaust gases of the burner flowing through the bores impart an additional spin to the hollow cylinder.

12. Apparatus for burning the contaminated soot particles in the exhaust gases of diesel motors of vehicles conducted through an exhaust gas line, wherein the exhaust gas line comprises a housing with a burner operated by a fuel/air mixture for burning the contaminated soot particle in the exhaust gas flow, the housing (29) comprising a hollow cylinder (26) rotatably supported in the exhaust gas flow, the housing and the hollow cylinder defining a reversal chamber for the exhaust gas flow, the hollow cylinder comprising drive vanes (10, 11, 18), means for directing the exhaust gas flow of the diesel motor and the exhaust gases of the burner toward the drive vanes, the burner being arranged upstream of an open end face of the hollow cylinder, such that the exhaust gases of the burner heat the hollow cylinder up to the combustion gas temperature of the soot particles.

13. Apparatus according to claim 12, wherein the hollow cylinder comprises a shaft (9) having end segments and is connected with the shaft by means of radially extending webs, the end segments of the shaft each being supported in a bearing bush (14, 15), the housing comprising two bearing flanges (2, 3) and the baring flanges being connected with the bearing bushes by means of additional radially extending webs (16, 17).

14. Apparatus according to claim 13, wherein the webs connecting the hollow cylinder with the shaft are the drive vanes.

15. Apparatus according to claim 13, wherein the drive vanes are arranged on the shaft.

16. Apparatus according to claim 13, wherein the drive vanes are arranged on an inside wall of the hollow cylinder.

17. Apparatus according to claim 13, wherein the drive vanes are arranged on an outer wall of the hollow cylinder.

18. Apparatus according to claim 12, wherein a hollow shaft with drive vanes is rotatably supported upon the shaft of the hollow cylinder.

19. Apparatus according to claim 12, wherein the end segment of the shaft facing the exhaust gas flow comprises a stagnation- and reversal member for the exhaust gases of the burner.

20. Apparatus according to claim 19, wherein the stagnation-and reversal member is a cone (24).

21. Apparatus according to claim 12, wherein the hollow cylinder and the bearing flange define an outlet gap (19) for the exhaust gas flow in an outlet region of the exhaust gas flow from the hollow cylinder.

22. Apparatus according to claim 12 wherein the hollow cylinder (26) is perforated with bores, the quantity of the bores (27) being selected and each axis of the bores being inclined to the axis of the hollow cylinder, such that the exhaust gas flow and/or the exhaust gas burner flowing through said bores impart and additional spin to the hollow cylinder.

23. Apparatus for burning contaminated soot particles in the exhaust gases of diesel motors of vehicles conducted through an exhaust gas line, wherein the exhaust gas line comprises a housing with a burner operated with a fuel/air mixture for burning the contaminate soot particles in the exhaust gas flow, the housing (29) comprising a rotatably supported perforated hollow cylinder (26) through which flow the exhaust gases of the diesel motor and the exhaust gases of the burner, the housing and the hollow cylinder define a first chamber for the exhaust gas flow and a second chamber for the exhaust gases of the burner, the hollow cylinder comprising drive vanes (10, 11, 18), means for directing at least one of the exhaust gas flow of the diesel motor and the exhaust gases of the burner toward the drive vanes, means for conducting the gas flow and the exhaust gases of the burner flow through an open end face of the perforated hollow cylinder, such that the exhaust gases of the burner heat the hollow cylinder up to the combustion temperature of the soot particles.

24. Apparatus according to claim 23, comprising a plain bearing mount between the housing and the perforated hollow cylinder for forming the two chambers.

25. Apparatus according to one of claims 1, 12 or 23 wherein the housing with the hollow cylinder is arranged directly downstream of an exhaust gas manifold.

* * * * *